US008291472B2

(12) United States Patent
Bak et al.

(10) Patent No.: US 8,291,472 B2
(45) Date of Patent: Oct. 16, 2012

(54) REAL-TIME ADJUSTMENTS TO AUTHENTICATION CONDITIONS

(75) Inventors: Nathan V Bak, Portland, OR (US); Patricia A Gaughen, Portland, OR (US); Avantika R Mathur, Tigard, OR (US); Timothy C Pepper, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/695,647

(22) Filed: Jan. 28, 2010

(65) Prior Publication Data

US 2011/0185401 A1   Jul. 28, 2011

(51) Int. Cl.
*H04L 9/32* (2006.01)
(52) U.S. Cl. .......................... 726/2; 726/3; 726/4; 726/5
(58) Field of Classification Search .................. 726/2–7, 726/19; 713/150, 168–170, 181; 709/217–218, 709/223–225
See application file for complete search history.

(56) References Cited

U.S. PATENT DOCUMENTS

| 5,394,471 | A  |   | 2/1995  | Ganesan et al. |
|-----------|----|---|---------|----------------|
| 7,664,845 | B2 | * | 2/2010  | Kurtz et al. ................... 709/224 |
| 7,937,462 | B2 | * | 5/2011  | Andreev et al. ................ 709/224 |
| 2004/0068650 | A1 |   | 4/2004  | Resnitzky et al. |
| 2005/0021964 | A1 |   | 1/2005  | Bhatnagar et al. |
| 2005/0198537 | A1 |   | 9/2005  | Rojewski |
| 2005/0216955 | A1 |   | 9/2005  | Wilkins et al. |
| 2007/0169181 | A1 |   | 7/2007  | Roskind |
| 2008/0016369 | A1 |   | 1/2008  | Kirovski et al. |
| 2008/0222706 | A1 |   | 9/2008  | Renaud et al. |
| 2008/0313721 | A1 |   | 12/2008 | Corella |
| 2009/0144547 | A1 |   | 6/2009  | Roig |

OTHER PUBLICATIONS

Author: M.E. Bsaibes; Ttl: Set Limit for Number of Bad Password Retries for Local Area Network Server Logon; Database: IP.COM; IP.COM No. IPCOM000117811D; Date: Jun. 1, 1996.

* cited by examiner

*Primary Examiner* — Hosuk Song
(74) *Attorney, Agent, or Firm* — Steven L. Bennett

(57) ABSTRACT

Embodiments of the invention provide for adjusting authentication conditions in real-time. A graph-theoretic data structure is dynamically constructing, having nodes corresponding to received valid and invalid authentication credentials used in attempts to access a system. Based on the graph-theoretic data structure, embodiments compute a probability of an invalid credential being an authentication attempt by a particular type of user. If the probability is beyond a threshold probability, embodiments trigger a security event is to adjust an authentication condition of the system, e.g., to increase or decrease a maximum permissible number of failed login attempts within a certain period of time.

20 Claims, 11 Drawing Sheets

T1:

T2:

T0:

T1:

T2:

T3:

REAL-TIME ADJUSTMENTS TO AUTHENTICATION CONDITIONS

FIELD

Embodiments of the invention relate generally to authentication systems and, in particular, to adjusting authentication conditions in real-time.

BACKGROUND

Authentication is the act of establishing or confirming something or someone is what it/he/she claims to be. Authentication may involve, for example, confirming identity of a person, tracing the origins of an object, or tracing the origins of information received from a source. For many systems today, before access to the system is permitted, authentication is required. Many users encounter sites requiring authentication several times throughout a day. This authentication typically involves entering a password (e.g., submitting a username and password, or providing a card number and pin). Users commonly reuse passwords between multiple sites. To some, this is considered good security practice because it allows a user to remember his/her password.

A malicious user (e.g., a malicious computer program or an unauthorized person attempting to circumvent a security system) may attempt to use brute force to guess passwords, e.g., to gain access to a system or to mount a denial-of-service (DoS) attack. A denial-of-service attack is an attempt to make a computer resource unavailable to its intended users. If a malicious user or their activity is not limited in some way, their activity can consume a system's computing resources and quickly lead to denial of service to the system's intended user(s). To avoid this scenario, many systems implement a maximum failed login policy to avoid system resources from being attacked. With such a policy, a user is permitted a certain number (e.g., three) failed logins before the system "locks-out" further login attempts, preventing any user from attempting to login to that account. This policy may be encountered by users of voicemail systems, computer application log-ins, and online account log-ins (e.g., at a bank website), for example. To "unlock" the account, an intended user may have to reset the password, which may involve contacting an information technology (IT) administrator, who may contact the intended user's manager or another individual to verify access privileges, and/or waiting some time (e.g., 24 hours or more) before the account is unlocked.

BRIEF SUMMARY

Embodiments of the invention provide a method for adjusting authentication conditions in real-time, the method including dynamically constructing within a device coupled to a system a graph-theoretic data structure, the graph-theoretic data structure having nodes corresponding to received valid and invalid authentication credentials used in attempts to access the system; in response to receipt of an invalid credential, computing based on the graph-theoretic data structure a probability of the invalid credential being an authentication attempt by a particular type of user; and if the probability is beyond a threshold probability, triggering a security event to adjust an authentication condition of the system. The dynamically constructing may include, if a newly received credential has no corresponding node in the data structure, adding in real-time a new node to the data structure corresponding to the newly received credential and, if a last received preceding credential was an invalid credential, adding a directed edge from a last node corresponding to the last received preceding credentials to the new node, and computing in real-time a weight for a directed edge between nodes corresponding to consecutively received credentials.

Embodiments also provide a security module for triggering real-time adjustments to authentication conditions of a system, the security module including a non-static graph-theoretic data structure; and a graph analysis module coupled to the non-static graph-theoretic data structure. The non-static graph-theoretic data structure may include dynamically constructed nodes corresponding to received valid and invalid authentication credentials used in attempts to access the system, and dynamically weighted directed edges between nodes corresponding to consecutively received credentials. The graph analysis module may include logic components configured to compute, based on the non-static graph-theoretic data structure, a probability of an invalid credential being an authentication attempt by a particular type of user in response to receipt of the invalid credential, and to trigger a security event to adjust an authentication condition of the system if the probability is beyond a threshold probability.

Embodiments further provide a system for adjusting authentication conditions in real-time, the system including a server coupled, via a network, to a client device, the server to require valid authentication credentials from the client device prior to providing the client device access to items in the server; a backend authorization system coupled to the server, the backend authorization system to establish authentication conditions for access to the server; and a security module coupled to the server and the backend authorization system, the security module including a non-static graph-theoretic data structure including dynamically constructed nodes corresponding to received valid and invalid authentication credentials used in attempts to access the server, and dynamically weighted directed edges between nodes corresponding to consecutively received credentials; and a graph analysis module coupled to the non-static graph-theoretic data structure, wherein the graph analysis module includes logic components configured to compute, based on the non-static graph-theoretic data structure, a probability of the invalid credential being an authentication attempt by a particular type of user in response to receipt of an invalid credential, and, if the probability is beyond a threshold probability, to trigger transmission of a security event to the backend authorization system to adjust an authentication condition for access to the server.

BRIEF DESCRIPTION OF THE DRAWINGS

Embodiments of the invention are described by way of example with reference to the accompanying drawings wherein.

DETAILED DESCRIPTION

Figure 1:
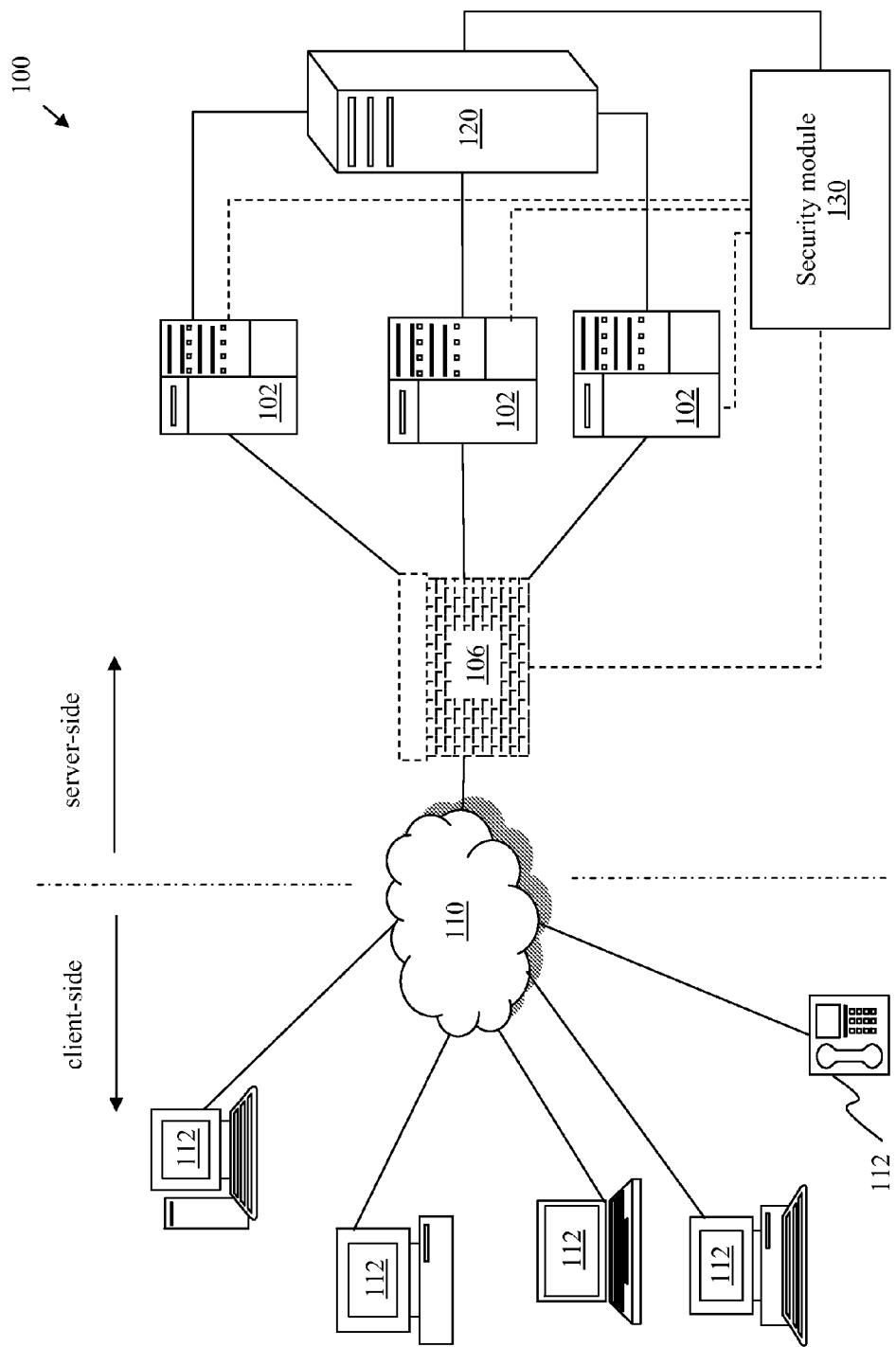
FIG. 1 is an illustration of a system in accordance with one embodiment of the invention.

Embodiments of the invention relate generally to authentication systems and, in particular, to adjusting authentication conditions in real-time. Authentication conditions are the parameters of a system's authentication activities. Authentication conditions include, but are not limited to, the number of failed logins permitted for a particular account before a system blocks further attempts to login to the account without additional actions (e.g., clearance from a system administrator).

Authentication conditions, e.g., limits on login attempts, can be useful in protecting a system from unintended user or uses. A security policy that uses fixed and readily discoverable authentication conditions, e.g., placing a knowable blanket limit on account login attempts, can make attacks from malicious users simpler, rather than more difficult. For example, if a malicious user is aware of a three attempt lock-out policy, the malicious user can attempt three failed logins on several accounts (knowing it does not need to attempt more than three) to prevent many intended users from logging in. Despite this, limits on authentication attempts can be a useful tool to protect against malicious users, particularly when intelligent computing systems and methods are applied to aid in distinguishing between malicious failed logins (e.g., a malicious user carrying out a brute force attack) and legitimate failed logins (e.g., an intended user accidentally typing his/her password incorrectly, or typing a different password that he/she uses at another site).

Considering the number of sites that, understandably, require authentication today, many users have classes of passwords that they reuse for different sites. The classes tend to be reused and/or shared among sites having similar security concerns. For example, a user may reuse or share between sites with less sensitive information more trivial and weaker passwords. A user may reuse or share between sites with more sensitive information (e.g., financial, medical, or personal data) stronger passwords, or may limit reuse, or not reuse, a particular password if he/she uses that password to access a very secure site. When an intended user attempts to log into a site, there is a likelihood the user may use a password valid for a different website, or make a typographical error entering the password. If a site's security policy places a blanket limit on login attempts, without or with little computing intelligence as to whether the login attempt is a legitimate failed login or a malicious failed login (i.e., a malicious attempt at access), there is a significant likelihood that legitimate users will lock themselves out. This result may be counter to a security system's underlying objective of providing easy access to legitimate users, while preventing malicious users from using the system's resources.

Embodiments of this invention provide computing intelligence to aid in distinguishing, in real-time, between authentication attempts by intended users and authentication attempts by unintended users. Embodiments of this invention adjust authentication conditions by dynamically constructing a graph-theoretic data structure within a device. In use, the graph-theoretic data structure is constructed and traversed in real-time to compute a probability of an invalid credential being an authentication attempt by a particular type of user.

FIG. 1 is an illustration of a system in accordance with one embodiment of the invention. In FIG. 1, the system 100 includes servers 102, a backend authentication system 120, a security device 106, a network 110, client devices 112, and a security module 130. The server 102 is coupled one or more client device 112, via the optional security device 106 and the network 110. The server 102 requires valid authentication credentials from the client device 112 prior to providing the client device access to items (which may include services, data, files, etc.) on the server. Access to items on the server may include access to a web service if the server is a web server, or to data stored in the server or in an attached storage system (not shown) if the server is a ftp server, for example.

The optional security device 106 is located between, and coupled to, the server 102 and the network 110. The security device 106 may be included in systems with enhanced security. The security device 106 may be, for example, a hardware or software firewall. In one embodiment, adjusting authentication conditions involves adjusting conditions controlled by the security device 106, as described in more detail below with reference to FIG. 8.

The network 110 couples server-side devices to client-side devices. The network 110 may be, for example, any type of network, including a local area network (LAN) or a wide area network (WAN).

The client device 112 may be any of a variety of now known or future known devices that access items the server 102. For example, the client device may be a desktop computer, a workstation, a laptop, a VOIP telephone, a mobile phone, etc.

The backend authorization system 120 is coupled to one or more servers 102. The backend authorization system 120 establishes authentication conditions for access to the server. For example, the server 102 may receive a credential from a client 112 and transmit that credential to the backend authorization system 120, which may be located locally or remotely (e.g., when administered by an entity specializing in security/cryptography), for example. In FIG. 1, the backend authorization system 120 analyzes the received credential and transmits back to the server 102 whether the credential is a valid or invalid. In certain embodiments, if the credential is invalid, the backend authorization system 120 responds with additional actions, e.g., logging a security event or transmitting a security alert to another device. If the backend authorization system 120 determines that a DoS attack is underway, for example, it may transmit a security alert to the mobile phone of an IT administrator.

The system 100 includes a security module 130. In FIG. 1, the security module 130 is coupled the backend authorization system 120. The security module may also be coupled, alternatively or additionally, to a server 102 and/or the security device 106. In one embodiment, the security module is located in a geographically remote location from the server (e.g., 102). For example, the security module may be located in a different city than the server, and be coupled to the server and/or the backend authorization system via a cloud. A security module in accordance with one embodiment of the invention is described further with reference to FIG. 2.

Figure 2:
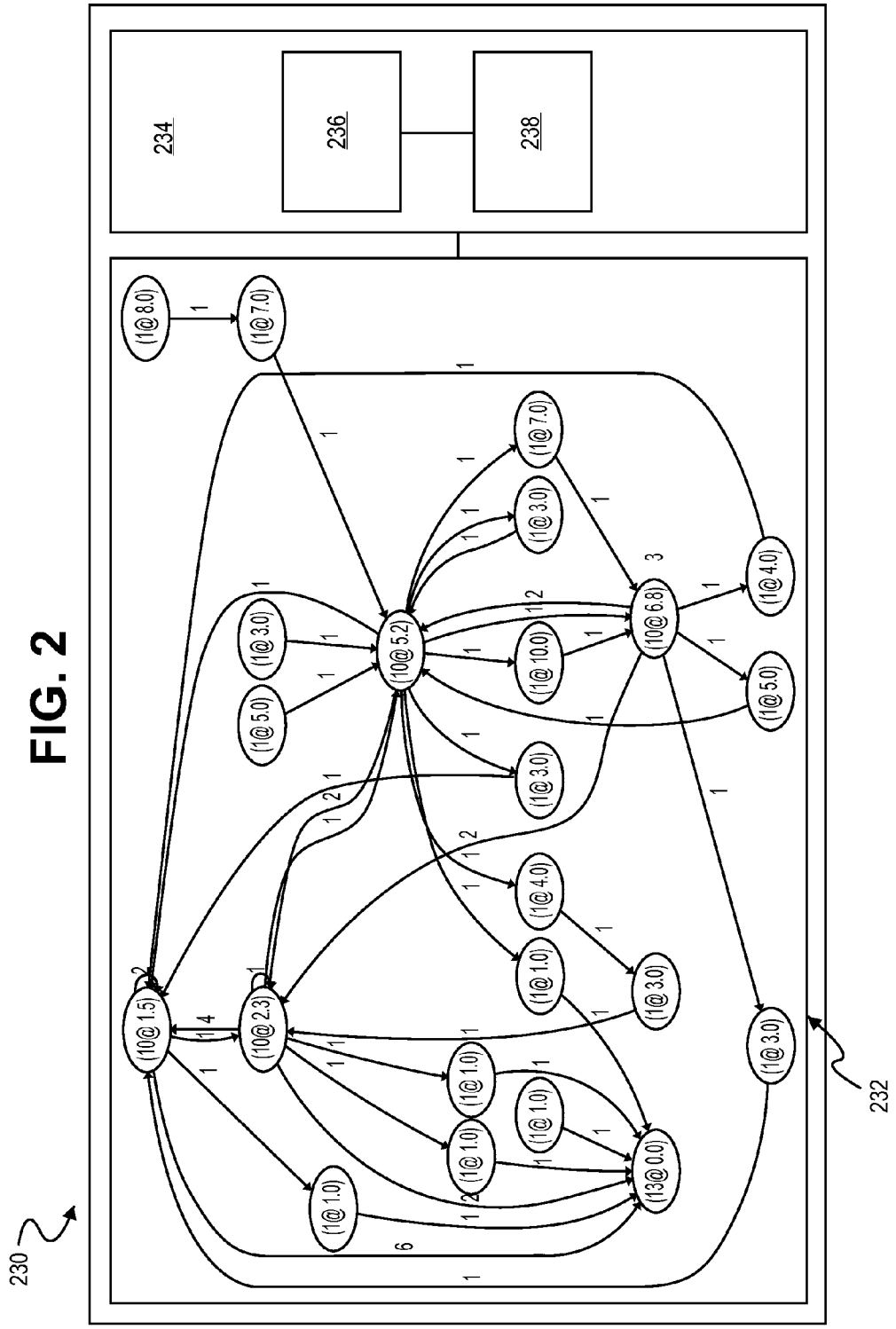
FIG. 2 is a depiction of a security module in accordance with one embodiment of the invention.

FIG. 2 is a depiction of a security module in accordance with one embodiment of the invention. The security module 230 includes a non-static graph-theoretic structure 232 and a graph analysis module 234. The non-static graph-theoretic structure 232 includes dynamically constructed nodes and dynamically weighted directed edges between nodes. The dynamically constructed nodes correspond to valid and invalid authentication credentials received by the system and used in attempts to access the system (e.g., the server 102). In an exemplary embodiment, each authentication credential is a cryptographic hash value. The dynamically weighted directed edges between nodes correspond to consecutively received credentials.

The graph analysis module 234 is coupled to the non-static graph-theoretic data structure 232. The graph analysis module 234 includes logic components configured to compute, based on the non-static graph-theoretic data structure 232, a probability of an invalid credential being an authentication attempt by a particular type of user in response to receipt of the invalid credential. For example, in FIG. 2, the graph analysis module 234 includes a user probability calculator module 236. The user probability calculator module 236 is configured to compute, based on the graph-theoretic data structure 232, a probability of the invalid credential being an authentication attempt by a particular type of user. In certain embodiments, the probability calculated is or includes the likelihood that the source of the invalid credential is a legitimate or intended user of the system who may have mistyped the password, for example. In certain embodiments, the probability calculated is or includes the likelihood that the source of the invalid credential is a malicious user attempting to gain unauthorized access to the account or system, or attempting a more extensive attack on the system, for example.

In FIG. 2, the logic components of the graph analysis module 234 are configured to trigger transmission of a security event (e.g., to the backend authorization system 120) to adjust an authentication condition for access to the server (e.g., 102) if the probability is beyond a threshold probability. For example, in FIG. 2, the graph analysis module 234 includes a security event transmitter 238 coupled to the user probability calculator module 236. The security event transmitter 238 is configured to transmit a security event to adjust an authentication condition of a system (such as, or including, the server 102) if the probability of the invalid credential being an authentication attempt by a legitimate user is above the threshold probability. For example, the security event transmitter 238 may be coupled to a receiver in the backend authorization system 120, and transmit to the backend authorization system 120 a security event informing it that the invalid credential is likely an authentication attempt by a legitimate user. The transmission may trigger the server or the backend authorization system to not count the invalid credential towards a default permissible number of invalid access attempts.

Figure 3:
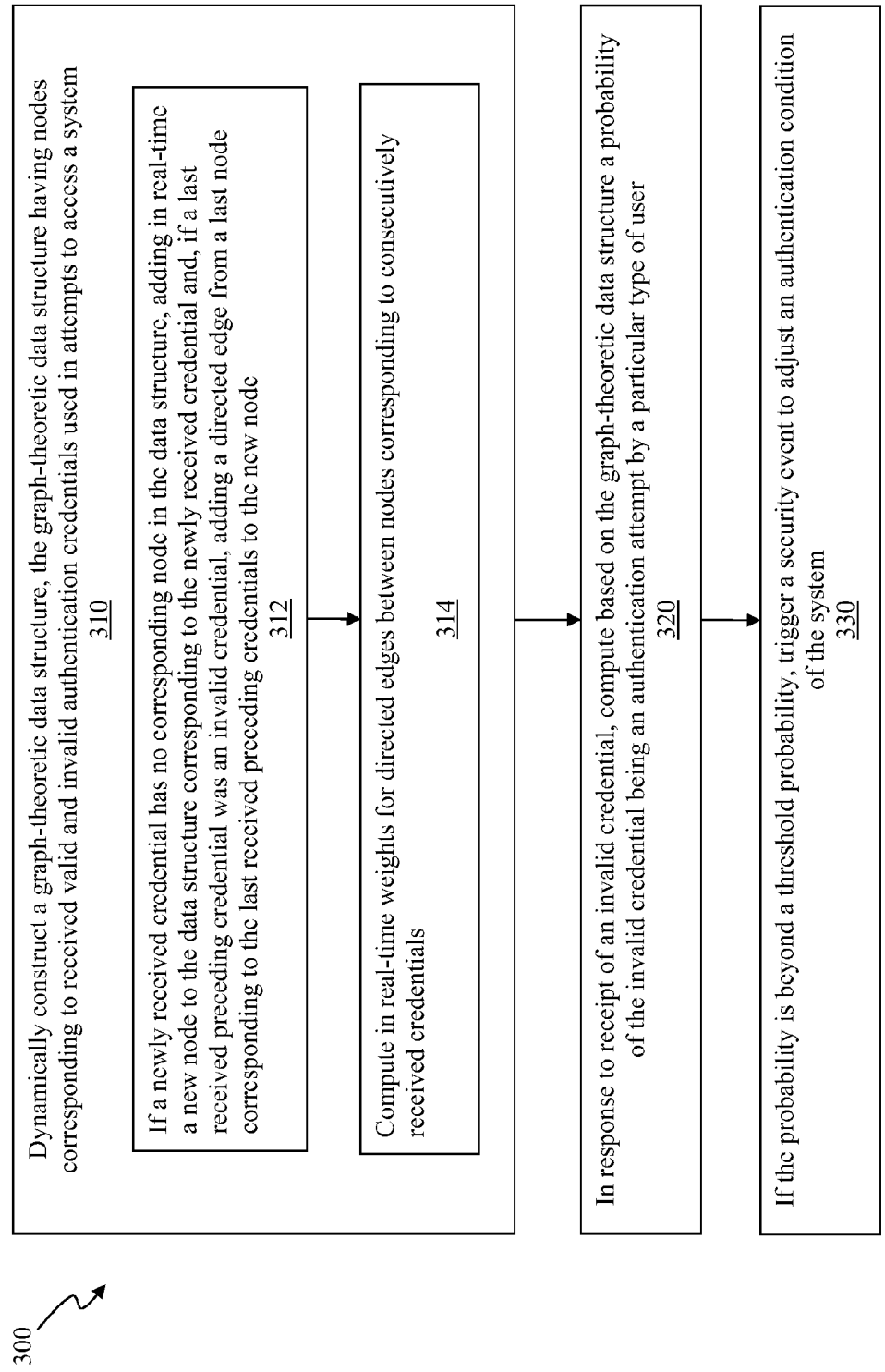
FIG. 3 is a block diagram of a process in accordance with embodiments of this invention.

FIG. 3 is a block diagram of a process 300 in accordance with embodiments of the invention. The process 300 adjusts authentication conditions in real-time. At 310, a graph-theoretic data structure is dynamically constructed. In one exemplary embodiment, the graph-theoretic data structure is constructed within a device coupled to a physical system. The security module 230 may be such a device. A server 102 may be such a physical system. The graph-theoretic data structure (e.g., 232) has nodes corresponding to received valid and invalid authentication credentials used in attempts to access the system. The authentication credentials may have been received by a server 102 or the backend authorization system 120 from a client 112, for example.

As shown at 312, in one exemplary embodiment, dynamically constructing at 310 includes, if a newly received credential has no corresponding node in the data structure, adding in real-time a new node to the data structure corresponding to the newly received credential. Also at 312, if the last received preceding credential was an invalid credential, a directed edge from the node corresponding to the last received preceding credentials to the new node is added. This is described further with reference to FIGS. 4A-4B.

Figure 4A:
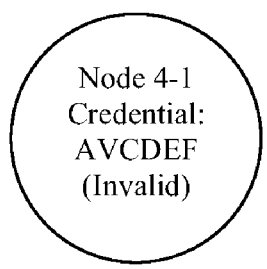
FIGS. 4A-4B are representations of a part of a data structure at various times in accordance with embodiments of the invention.
Figure 4B:
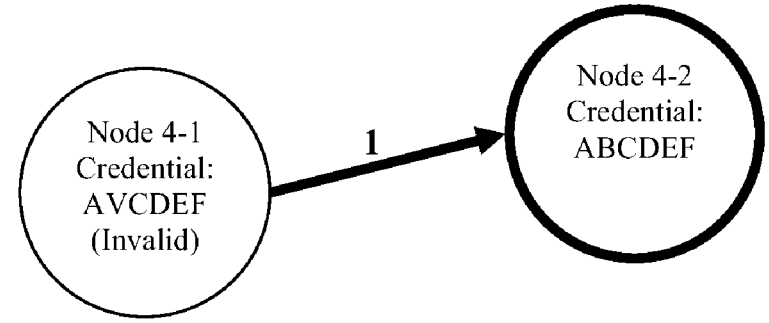

FIGS. 4A-4B are representations of a part of a data structure at various times in accordance with embodiments of the invention. In FIG. 4A, at a point in time T1, a data structure has a node corresponding to a received credential AVCDEF, which is an invalid credential in this example. Later, the user submits a credential corresponding to ABCDEF that has not been previously received and for which no node exists in the data structure at time T1. Accordingly, in FIG. 4B, at time T2, a new node is added to the data structure corresponding to the newly received credential ABCDEF. A directed edge is also added from the last node corresponding to credential AVCDEF to the new node corresponding to credential ABCDEF. In one embodiment, a separate list of pointers is employed to lookup a given received credential so that determining whether a current observed credential is in the graph may be performed without traversing the graph.

Referring back to FIG. 3, in one exemplary embodiment, at 314, dynamically constructing includes computing in real-time weights for directed edges between nodes corresponding to consecutively received credentials. For example, for the edge between the newly created node corresponding to credential ABCDEF and the node corresponding to the previously received credential AVCDEF, embodiments of the invention compute in real-time a weight for the directed edge between the previous node and the newly created node. In embodiments in which edge weights are equal to usage counts, the weight is 1 since this is the first time this edge has been traversed, as shown in FIG. 4B. In some embodiments, the edge weight may be a function of the usage count but not equal to the usage count. In some embodiments, other factors may scale the edge weight to a higher or lower value. These factors may be, for example, the likelihood that the originating IP is a location of a legitimate user, the likelihood that the destination server(s) is the destination of a legitimate user, the protocol and/or port number transmitting the authentication, the likelihood that the legitimate user is attempting to access the system at that particular time, the likelihood that the legitimate user is attempting to access the system from the originating geographical location, etc.

Figure 5A:
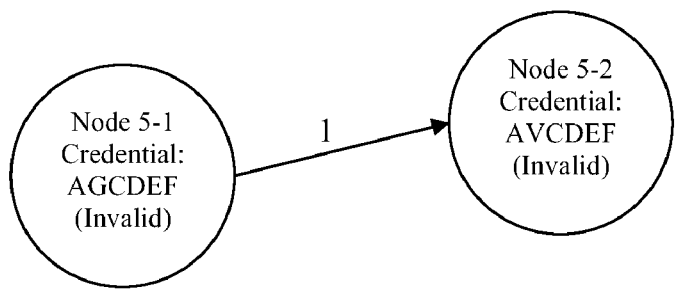
FIGS. 5A-5D are additional representations of a part of a data structure at various times in accordance with embodiments of the invention.
Figure 5B:
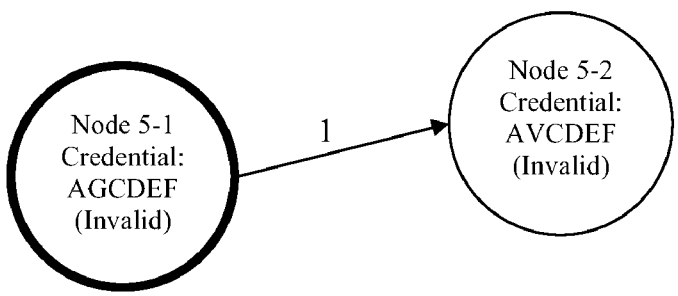
Figure 5C:
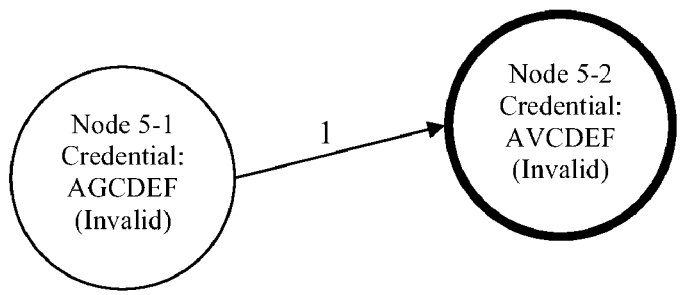
Figure 5D:
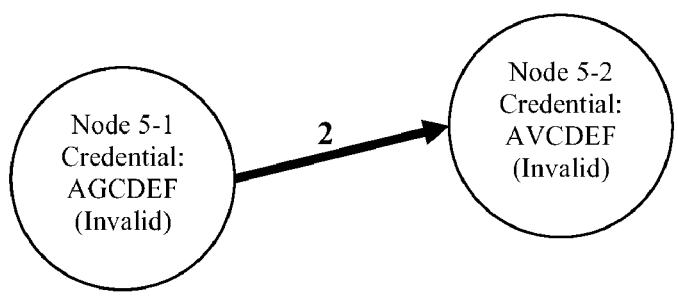

The process at 314 is further described with reference to FIGS. 5A-5D as an example. FIGS. 5A-5D are representations of a part of a data structure at various times in accordance with embodiments of the invention. In FIG. 5A, at time T0, credentials AGCDEF and AVCDEF have both been received before and exists in the data structure. In FIG. 5B, at time T1, the credential AGCDEF is again received. In FIG. 5C, at time T2, the credential AVCDEF is also again received. Even though a node already exists in the data structure corresponding to the credential AVCDEF, embodiments of the invention will still compute in a real-time a weight for the directed edge between the nodes corresponding to the consecutively received credentials AGCDEF and AVCDEF. In embodiments in which edge weights are equal to usage counts, since this is another instance of this edge being traversed, the weight is increased to 2, as shown in FIG. 5D. Accordingly, in certain embodiments, computing in real-time a weight for a directed edge between nodes corresponding to consecutively received credentials includes incrementing a usage count for an edge being traversed between the nodes corresponding to the consecutively received credentials. Such incrementing may directly increment the weight of an edge, in some instances. In other instances, such incrementing may factor into a mathematical function that determines the weight of an edge. The representations shown in FIGS. 5A-5D may reflect a scenario in which, for example, a legitimate user with a valid password ABCDEF has in the past, and again at time T1, mistyped his/her password as AGCDEF, which returned as a failed login, and then in the past, and again at time T2, tried to type the valid password only to mistype the password again, this time as AVCDEF.

In these examples, for ease of reading, the credentials and passwords are being represented as letters. However, it shall be readily understood that the invention is not so limited. In an exemplary embodiment, each authentication credential received for analysis by the security module is a cryptographic hash value. This may be particularly the case when public key encryption is utilized to protect against revealing the password should the transmission be intercepted.

Weights for other directed edges in the graph theoretic data structure may also be computed. For example, after receipt of the credential AVCDEF, the weight of an edge from a different node (not shown) to the node 5-2 may be decreased since that path was not traversed during this latest string of attempted access. As another example, after receipt of the credential AVCDEF, the weight of an edge to a node distant from the valid credential may be reduced. In some instances, the security module (e.g., 230) may remove that distant node and that distant node's edge to other node(s), thereby pruning the data structure. Accordingly, in one embodiment, the process may include pruning the graph-theoretic data structure to remove a node(s) and associated edge(s).

Referring again to FIG. 3, at 320, in response to receipt of an invalid credential, a probability of the invalid credential being an authentication attempt by a particular type of user is computed based on the graph-theoretic data structure. In an exemplary embodiment, that computation is performed by the security module (e.g., 230). In one embodiment, computing based on the graph-theoretic data structure (e.g., 232) a probability of the invalid credential being an authentication attempt by a particular type of user includes computing based on the graph-theoretic data structure a probability of the invalid credential being an authentication attempt by a legitimate user. For example, in certain applications, it may be desirable to have a system that, by default has strict restrictions on a maximum number of login attempts during a certain period of time (or other strict authentic conditions). The default may be, for example, to lock further login attempts after three failed attempts, unless there is a sufficient probability that the attempt is being made by a legitimate user. For example, a user may be attempting to login using an older password forgetting that he/she has recently changed his/her password. In such cases, it may be desirable to allow the user who is typing and/or mistyping his/her older password three times to have additional login attempts. In another instance, the user may be, for example, attempting to login from a work computer she has not tried before. Her home computer may have a password manager that memorizes her password so that she does not have to enter it manually. When she attempts to login from work, however, she may need to enter the password manually, and this may usually take her two or three tries before getting the password correct. Embodiments of this invention include graph-theoretic data structures that reflect such activity, and that are dynamically refined at each login attempt to remain current. Accordingly, embodiments may provide a probability that a login activity reflects a known behavior of a legitimate user, based on such a graph-theoretic data structure.

In one embodiment, computing, based on the graph-theoretic data structure, a probability of the invalid credential being an authentication attempt by a particular type of user includes computing based on the graph-theoretic data structure a probability of the invalid credential being an authentication attempt by a malicious user. For example, in certain applications, it may be desirable to have a system that, by default, provides relatively lenient login attempts (or other lenient authentication conditions), unless there is a sufficient probability that the attempt is being made by a malicious user and/or that a security/resource attack is underway.

At 330, if the probability of the invalid credential being an authentication attempt by a particular type of user is beyond (above or below) a threshold probability, a security event is triggered to adjust an authentication condition of the system. In certain embodiments, this security event is triggered by the security module (e.g., 230). In other embodiments, this security event is triggered by a different component of the system, e.g., the backend authorization system 120.

For example, consider an embodiment in which the probability computed at 320 is the probability of the invalid credential being an authentication attempt by a legitimate user. If the probability is above the threshold (thereby indicating that a legitimate user is attempting to access the system), at 330, a security event is triggered to adjust an authentication condition of the system. This may be or include, for example, triggering a security event to exclude the invalid credential as a count against a permissible number of invalid access attempts. This also may be or include, for example, allowing a limited number of additional attempts above a default permissible number of invalid access attempts. If that limited additional number is reached, embodiments may ask for other information from the user instead of automatically locking out additional attempts. For example, consider a situation in which a legitimate user is attempting to log into a website to access online banking The user may mistype the password three times, e.g., once with caps lock on, then by entering a wrong key, then, believing perhaps a different password was used, entering one of her alternate passwords. Embodiments of the invention compute, based on the graph-theoretic data structure (which is traversed during the failed login attempts and dynamically updated with information from each attempt), a probability of the login attempts being by a legitimate user. If the probability is above a threshold, the system may first give the user two additional login attempts, for example. If the user again mistypes the password the two additional times (e.g., by retyping the alternative password believing perhaps she mistyped it, and then by trying a third alternate password), and the probability that the login attempts are by legitimate user are still above the threshold, the authentication conditions may be adjusted again, but this time to ask the user for the answer to a personal security question, for example. If the probability that the login attempts are by a legitimate user instead drops below the threshold after the two additional attempts, the system may instead of lock out additional attempts.

In certain embodiments, if (e.g., after the first three attempts, or even after a first attempt) the probability is below the threshold (thereby indicating that a user other than a legitimate user is attempting to access the system), at 330, a security event may be triggered (e.g., immediately) to adjust an authentication condition of the system. This may be or include, for example, triggering a security event to lock-out additional attempts to access the system, e.g., attempts from the originating source of the failed logins. If the thresholds are being missed throughout the system within a certain period of time, this may suggest a widespread security attack is under way. In response, embodiments of the invention may adjust the authentications conditions system-wide (e.g., to trigger a system-wide lock-out after a single invalid log-in for an account instead of the default three), or to adjust the threshold.

As another example, consider an embodiment in which the probability computed at 320 is the probability of the invalid credential being an authentication attempt by a malicious user. If the probability is above the threshold (thereby indicating that a malicious user is attempt to access the system), at 330, a security event may also be triggered to adjust an authentication condition of the system. This may be or include, for example, triggering a security event to lock-out additional attempts to access the system. If the probability is below the threshold (thereby indicating that a user other than a malicious user is attempting to access the system), at 330, certain embodiments also trigger a security event to adjust an authentication condition of the system. This may be or include, for example, triggering a security event to allow a limited number of additional attempts above a default permissible number of invalid access attempts.

Figure 6A:
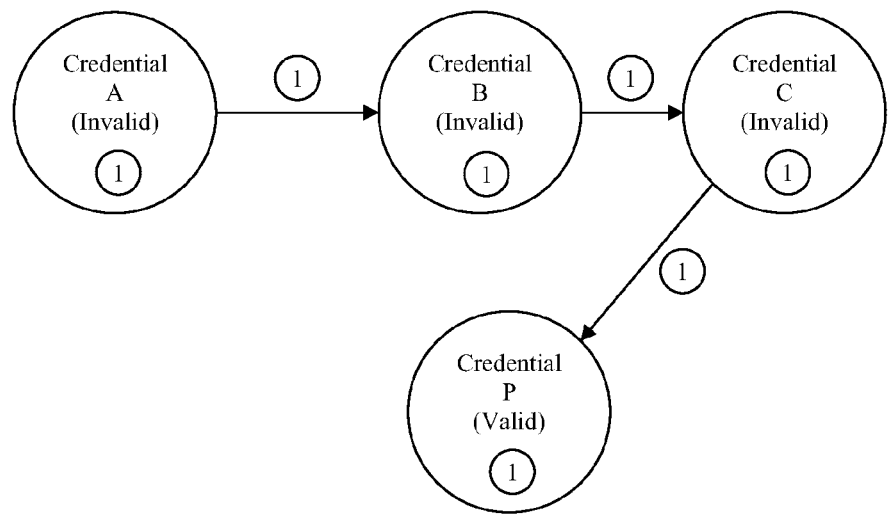
FIGS. 6A-6D is a representation of dynamic construction of a representation of a graph-theoretic data structure in accordance with embodiments of this invention.

FIGS. 6A-6D is a representation of dynamic construction of a representation of a graph-theoretic data structure in accordance with embodiments of this invention. FIG. 6A shows a representation of a graph-theoretic data structure after the system has received three failed logins from a user, and then a valid login. In one embodiment, the system recognizes the logins from the same user because the same username was entered for each of the failed logins. In other embodiments, an originating IP address may be used, for example. Each of the credentials have been seen by the system once before, illustrated in FIG. 6A by the number 1 with a circle around it inside each node. Additionally, each edge has been traversed once in the specified direction, illustrated in FIG. 6A by the number 1 with a circle around it near each directed edge. Assume that Credential C is (or represents) one of the user's common alternate passwords. In the current example, the system continues to run and over time, the system receives additional invalid credentials, and then receives Credential C and P again. The data structure now may be represented by FIG. 6B.

Figure 6B:
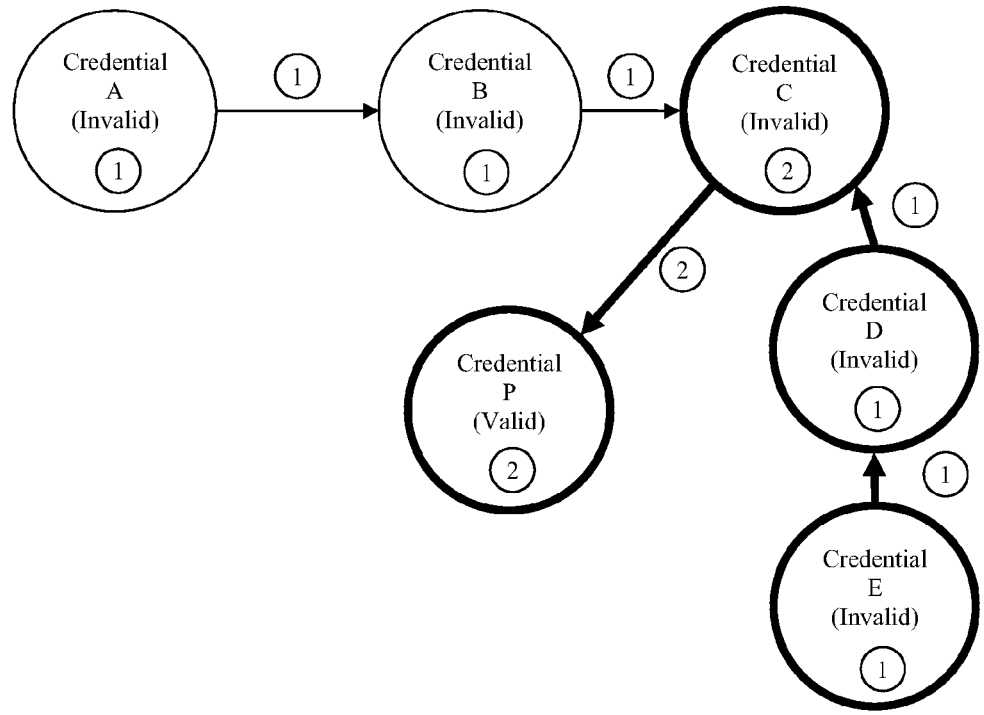

In FIG. 6B, Credential E was received, then Credential D, then Credential C and then Credential P. The circled 2 in the node representing Credential C and the node representing Credential P indicates that this is the second time each of Credential C and Credential P has been received. The circled 2 near the directed edge between Credential C and Credential P indicates that this is also the second time that edge has been traversed.

Embodiments of the invention traverse the graph (e.g., shown FIG. 6B) to calculate probabilities. For example, assume that Credential B is now observed for the second time. Embodiments of the invention compute the likelihood that Credential B, which is invalid, will be followed by Credential P, which is valid. Using one metric, the probability that Credential B will be followed by Credential P may be 0 since no direct edge currently exists in the data structure between the node representing Credential B and the node representing Credential P. Using another metric, the probability that Credential B will be followed by Credential P may be 1 (or 100%). This may occur if a graph walking algorithm (e.g., a depth first or breadth first algorithm) enumerating paths of length 2, for example, is used. Such a graph walking algorithm will out find that, out of the node representing the invalid Credential B, there is a path of length 2 that ends at the node representing the valid Credential P. These outcomes are summarized in Table 1, below.

TABLE 1

With reference to FIG. 6B.

| | | |
|---|---|---|
| Metric 1 | Pr (B → P) = 0 (i.e., 0%) | currently no directed edge between node representing Credential B and node representing Credential P |
| Metric 2 | Pr (B →P) = 1 (i.e., 100%) | a graph walking algorithm enumerating paths of length 2 out of node representing Credential B will find one such path that ends in node representing Credential P |

Continuing with this example, the system continues to run and over time, the system receives additional credentials, and continues to construct/refine the graph-theoretic data structure that it uses in real time. At time Tm, the data structure now may be represented by FIG. 6C, for example. If Credential E is observed, the calculated probabilities based on the data structure shown in FIG. 6C may be, for example:

TABLE 2

Figure 6C:
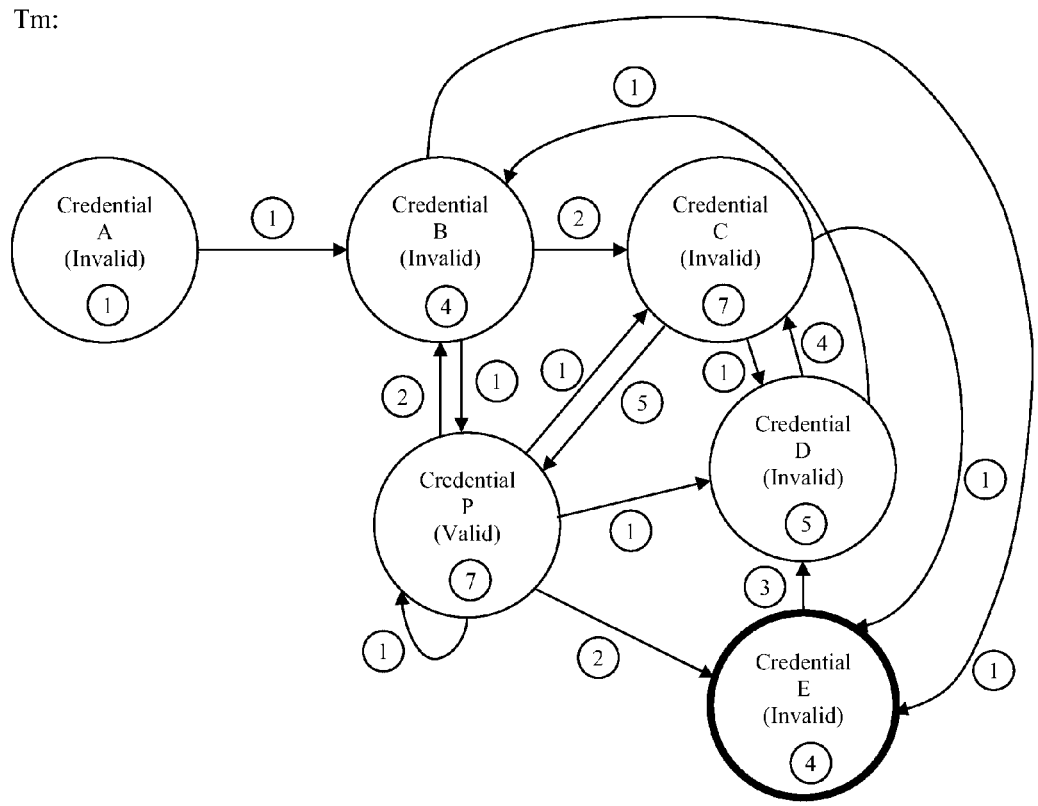

With reference to FIG. 6C.

| | | |
|---|---|---|
| Metric 1 | Pr (E → P) = 0 (i.e., 0%) | currently no directed edge from the node representing Credential E directly to the node representing Credential P (i.e., "one-hop" or a path of length 1) |

TABLE 2-continued

With reference to FIG. 6C.

| | | |
|---|---|---|
| Metric 2 | Pr (E →P) = 0 (i.e., 0%) | a graph walking algorithm enumerating paths of length 2 out of node representing Credential E will not find such a 2 length path that ends in the node representing Credential P |

At time Tn, Credential D is observed. The data structure now may be represented by FIG. 6D, for example. If Credential D is observed, the calculated probabilities based on the data structure shown in FIG. 6D may be still be 0 using Metric 1 since there are no directed edges from the node representing Credential D to the node representing Credential P, as understood with reference to FIG. 6D. However, using Metric 2, there is more than one "two-hop" path from the node representing Credential D ($node_D$) to the node representing Credential P ($node_P$), as shown in Table 3. As understood with reference to Table 3, 2/6 (or 1/3 or 33%) of the two-hop paths out from $node_D$ reach $node_P$.

TABLE 3

"Two-hop" paths out from $node_D$.

| Two-hop paths out from $node_D$ | Reaches $node_P$? | Ratio of paths from node representing invalid Credential D reaching node representing valid Credential P |
|---|---|---|
| D→C →D | No | 1/3 (33%) |
| D→C →P | Yes | |
| D→C →E | No | |
| D→B →P | Yes | |
| D→B →C | No | |
| D→B →E | No | |

Figure 6D:
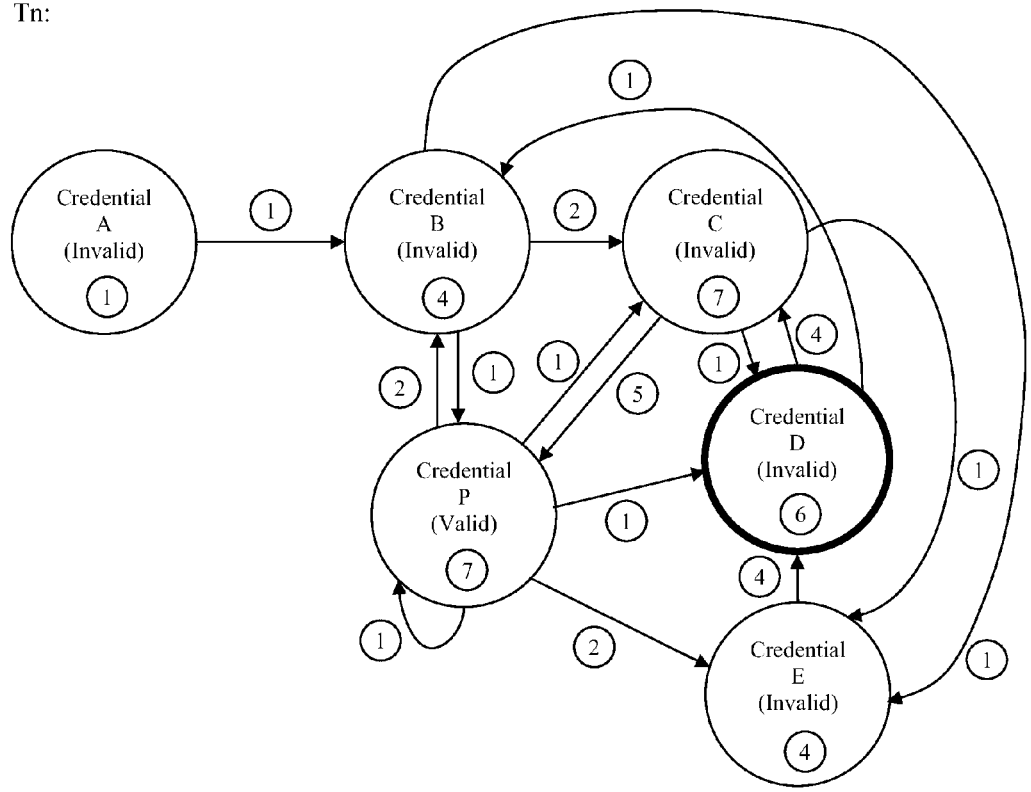

Accordingly, if Credential D is observed, the calculated probabilities based on the data structure shown in FIG. 6D for example Metrics 1 and 2 are shown in Table 4.

TABLE 4

With reference to FIG. 6D.

| | | |
|---|---|---|
| Metric 1 | Pr (D → P) = 0 (i.e., 0%) | currently no directed edge from the node representing Credential D directly to the node representing Credential P |
| Metric 2 | Pr (D →P) = 1/3 (i.e., 33%) | a graph walking algorithm enumerating paths of length 2 out of node representing Credential D will find such a 2 length path that ends in the node representing Credential P 1/3rd of the time. |

In certain embodiments, the probabilities of traversing a path may be scaled by edge weights. For example, two paths lead out from node: D→C and D→B. The path from D→C has been traversed four times while the path from D→B has been traversed once, as shown in FIG. 6D. This is shown in Table 5.

TABLE 5

With reference to FIG. 6D, wherein, in this example, edge weight is based on edge usage count.

| Paths out from $node_D$ | Weight (based on edge usage count in this example) |
|---|---|
| D→C | 4/5 |
| D→B | 1/5 |

Three paths lead out from $node_c$: C→D, C→P, and C→E. The path from C→D has been traversed once, the path from C→P has been traversed five times, and the path C→E has been traversed once, as shown in FIG. 6D. This is also shown in Table 6.

TABLE 6

With reference to FIG. 6D, wherein, in this example, edge weight is based on edge usage count.

| Paths out from $node_D$ | Weight (based on edge usage count in this example) |
|---|---|
| C→D | 1/7 |
| C→P | 5/7 |
| C→E | 1/7 |

Three paths lead out from $node_B$: B→P, B→C, and B→E. The path from B→P has been traversed once, the path from B→C has been traversed twice, and the path B→E has been traversed once, as shown in FIG. 6D. This is also shown in Table 7.

TABLE 7

With reference to FIG. 6D, wherein, in this example, edge weight is based on edge usage count.

| Paths out from $node_D$ | Weight (based on edge usage count in this example) |
|---|---|
| B→P | 1/4 |
| B→C | 2/4 |
| B→E | 1/4 |

Accordingly, Table 8 shows the probability of traversing a path from $node_D$ to $node_P$ scaled by edge weights in accordance with one embodiment.

TABLE 8

"Two-hop" paths out from $node_D$.

| Two-hop paths out from $node_D$ | Reaches $node_P$? | Scaling by edge weights | Percentage of observations traveling from node representing invalid Credential D to the node representing valid Credential P |
|---|---|---|---|
| D→C →D | No  | $4/5 * 1/7 = 4/35 = 11.4\%$  | |
| D→C →P | Yes | $4/5 * 5/7 = 20/35 = 57.1\%$ | $57.1\% + 5\% = 62.1\%$ |
| D→C →E | No  | $4/5 * 1/7 = 4/35 = 11.4\%$  | |
| D→B →P | Yes | $1/5 * 1/4 = 1/20 = 5\%$     | |
| D→B →C | No  | $1/5 * 2/4 = 2/20 = 10\%$    | |
| D→B →E | No  | $1/5 * 1/4 = 1/20 = 5\%$     | |

Table 9 shows calculated probabilities based on the data structure shown in FIG. 6D for Metric 1 and Metric 2 when scaled by edge weights described in the example above.

TABLE 9

With reference to FIG. 6D.

| Metric 1 | $Pr(D \to P) = 0$ (i.e., 0%) | currently no directed edge from the node representing Credential D directly to the node representing Credential P |
| Metric 2 | $Pr(D \to P) = 87/140$ (i.e., 62.1%) | a graph walking algorithm enumerating paths of length 2 out of node representing Credential D will find such a 2 length path that ends in the node representing Credential P 62.1% of the time. |

Table 10 shows calculated probabilities based on the data structure shown in FIG. 6D for Metric 1 and Metric 2 when the ratio of paths from $node_D$ reaching $node_P$ is scaled by the edge weights described in the example above.

TABLE 10

With reference to FIG. 6D.

| Metric 1 | $Pr(D \to P) = 0$ (i.e., 0%) | currently no directed edge from the node representing Credential D directly to the node representing Credential P |
| Metric 2 | $Pr(D \to P) = 1/3 * 87/140 = 87/420$ (i.e., 20.7%) | a graph walking algorithm enumerating paths of length 2 out of node representing Credential D will find such a 2 length path that ends in the node representing Credential P 20.7% of the time when scaled. |

Accordingly, in certain embodiments of the invention, computing the probability of the invalid credential being an authentication attempt by a legitimate user includes computing, based on the graph-theoretic data structure (e.g., 232), a probability of subsequently receiving a valid credential based on receipt of the invalid credential. This may include, for example, identifying all n-hop paths out from a node corresponding to the invalid credential, and determining what ratio of the all n-hop paths terminate at a valid credential node, e.g., described with reference to Table 3. This may also include, additionally or alternatively, determining a probability of traversing an n-hop path terminating at the valid credential node, e.g., described with reference to Tables 5-8. This may further include scaling the ratio by the probability of traversing, e.g., described with reference to Table 10. Determining the probability of traversing may be based on a factor such as a sum of weights of edges in the n-hop path, a magnitude of n, and/or a last traversal time of the n-hop path, for example.

In one embodiment, computing, based on the graph-theoretic data structure a probability of subsequently receiving a valid credential based on receipt of the invalid credential includes computing a historical ratio, wherein the ratio's numerator is a number of times an n-hop path from a node corresponding to the invalid credential to a valid credential node has been historically traversed and the ratio's denominator is a number of times the invalid credential has been historically received. For example, for the graph-theoretic data structure represented by FIG. 6D, if the received credential is C, the numerator for the ratio in this embodiment would be 5 and the denominator for the ration would be 7. In one embodiment, this ratio is scaled by a factor such as a probability of receiving a valid credential from the originating IP address of the invalid credential, a probability of receiving a valid credential from the originating geographical location of the invalid credential, a probability of the system being a security attack target, and/or a probability of receiving a valid credential at approximately a time the invalid credential was received, for example.

Figure 7:
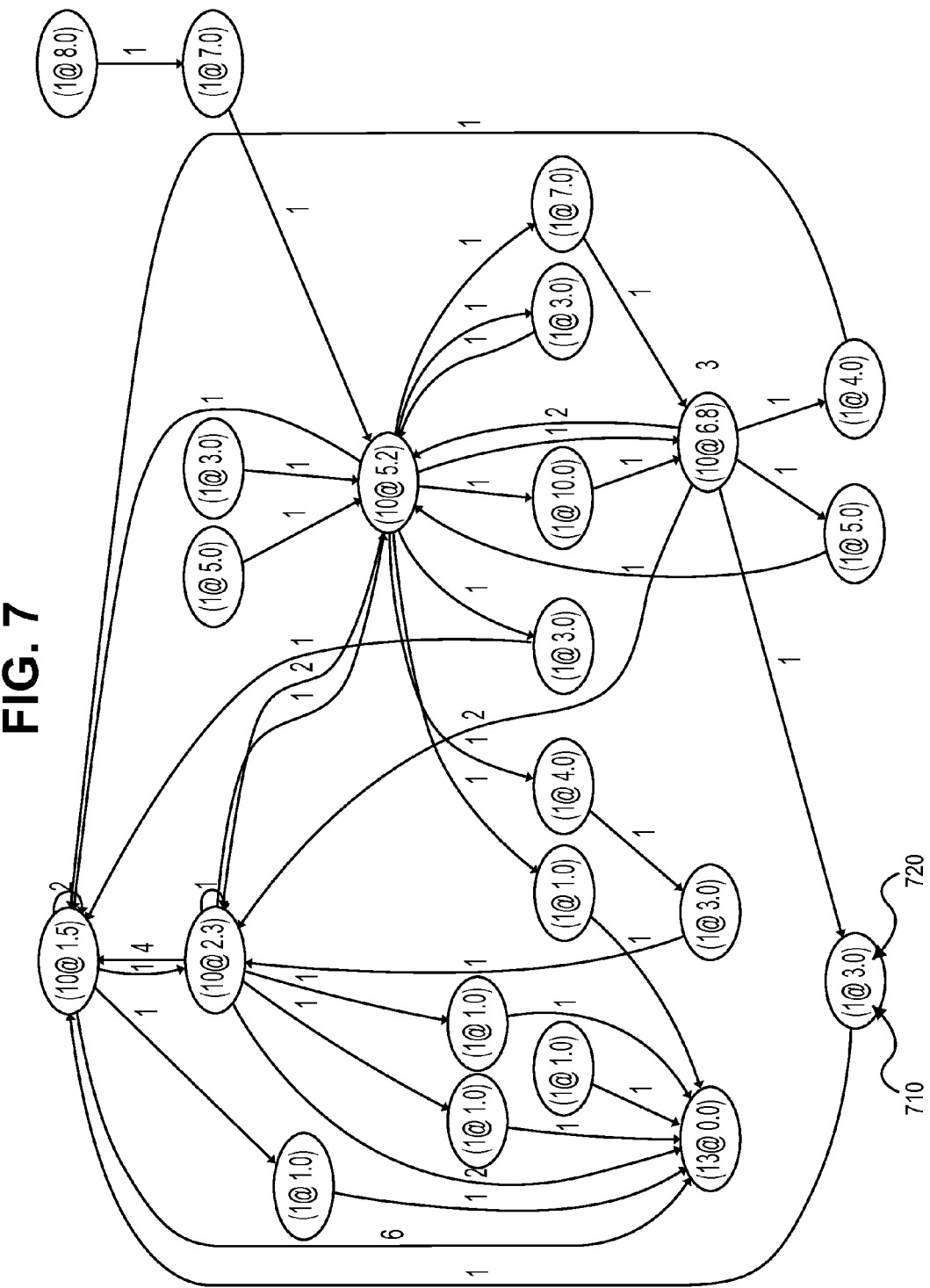
FIG. 7 is a representation of a graph-theoretic data structure in accordance with an embodiment of the invention.

FIG. 7 is a representation of a graph-theoretic data structure in accordance with an embodiment of the invention. In FIG. 7, each node represents a particular credential (e.g., a particular hash value). The first number in the node (e.g., 710) represents a number of times the hash value as been observed (e.g., received by the server 102). The second number in the node (e.g., 720) represents a number of hops between that node and a successful log-in. In one embodiment, this second number is an average number of hops from the node to a node representing the valid credential. In FIG. 7, the numbers next to the edge represent edge weights which may be the number of times that edge has been traversed. In certain embodiments, the edge weight is a function of the number of times that edge has been traversed, e.g., if the edge weight is also dependent on how long ago that edge was traversed (e.g., 1 day ago versus 1 month ago), for example.

If a valid credential is changed (e.g., if a password is changed), the numbers in the nodes shown in FIG. 7 may be offset for a period of time while the data structure adjusts with each new login attempt. In certain embodiments, the security module (e.g., 230) is coupled to a system which is aware of the password change. In one case, this system may be the backend authorization system 120. In such an embodiment, the security module may be configured to automatically adjust the data structure to account for the password change. For example, the security module may increase the weight between the old valid password and the new valid password in situations in which a user submitting the old valid password is likely to be a legitimate user (e.g., if the password change was initiated by the user in response to a quarterly password change requirement rather than due to an administrator reset or a user's report of suspected unauthorized account activity).

As noted above, embodiments of the invention may include pruning the graph-theoretic data structure to remove a node. In FIG. 7, for example, the node at the top right of the drawing numbered (1@8.0) may be pruned in one embodiment. Accordingly, in this example, pruning the graph-theoretic data structure includes removing a node having a shortest n-hop path terminating at a valid credential node, wherein n is at or above a threshold magnitude (e.g., 8.0 in this example). In one embodiment, pruning the graph-theoretic data structure includes removing a node with the lowest visit, and removing edges to and from such node, until the node count is below a threshold. This may be done each time a node is added, for example. In one embodiment, pruning the graph-theoretic data structure includes removing a node if the number of times it has been visited is below a threshold number and the last time the node was observed is longer than a certain period of time, and removing edges to and from such node. In one embodiment, pruning the graph-theoretic data structure includes removing a node with outgoing edges having a value within a threshold range (e.g., between 0 and 1, or between −1 and 1, for example). Pruning the graph may lead to total probabilities that do not sum to 100%. However, for the purposes of some embodiments of this invention, such a result may be acceptable, e.g., if determining relative probability is sufficient.

Figure 8:
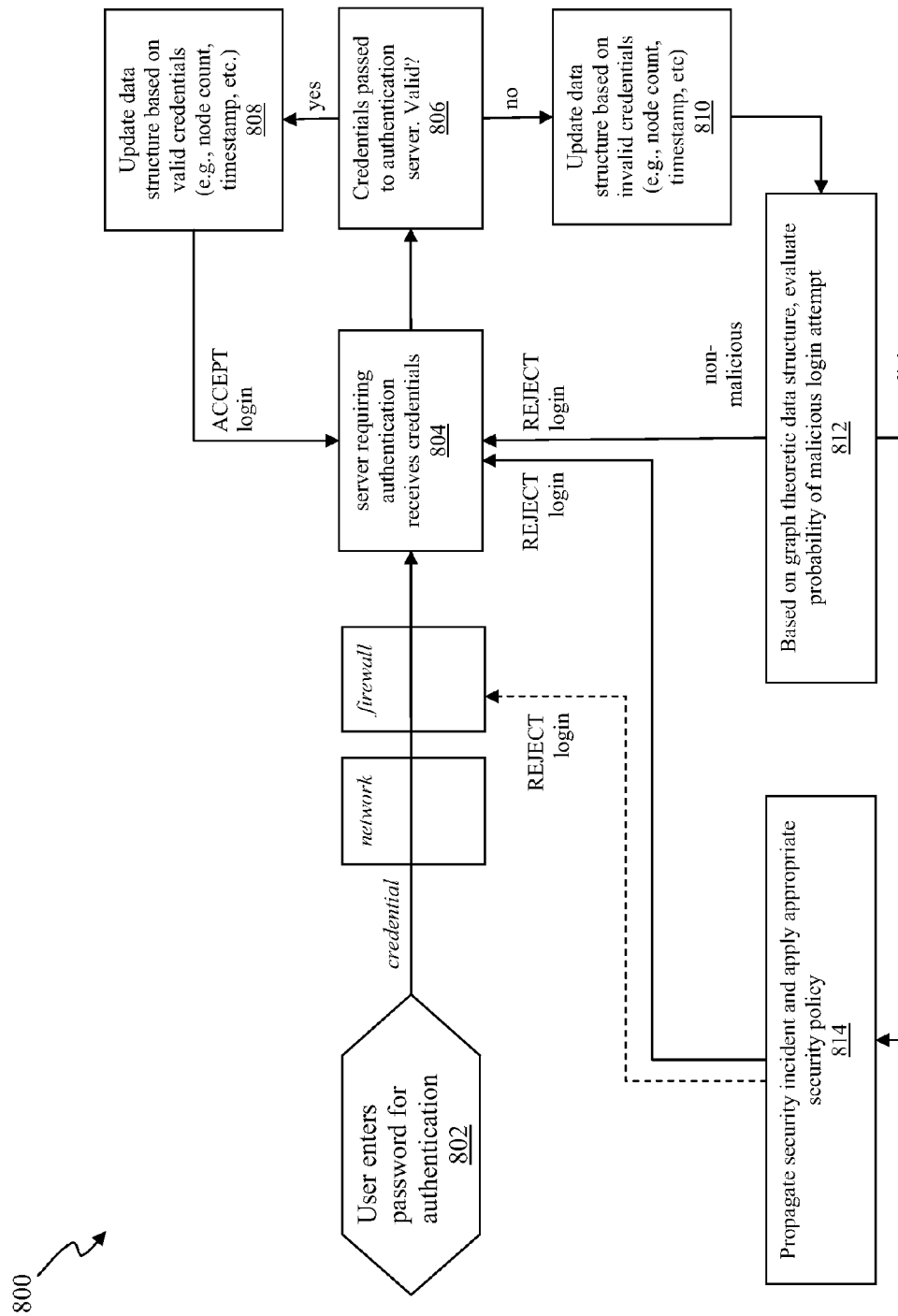
FIG. 8 is a block flow diagram in accordance with embodiments of this invention.

FIG. 8 is a block flow diagram in accordance with embodiments of this invention. At 802, a user (e.g., a person or a program) enters a password for authentication in an attempt to access a server/service. In an exemplary embodiment, the password is converted into a credential (e.g., a cryptographic hash value) which is then transmitted through the network and firewall to the target server. At 804, the server/service requiring authentication before it provides access to its items/services receives the credentials. The credentials are passed to the authentication server (e.g., 120), and the validity of the credentials are determined at 806 (e.g., by 120).

If the credentials are valid, at 808, a graph-theoretic data structure (e.g., 232) is updated based on the valid credential. For example, the node representing the valid credential may be associated with a number of times the node has been observed (e.g., 720). This number may be incremented by one at 808, for example. Other properties associated with valid credential may also be updated, e.g., the timestamp of the most recent receipt of the credential, etc. A communication is transmitted to the server to accept the login or that the login is valid.

If the credentials are invalid, at 810, a graph-theoretic data structure (e.g., 232) is updated based on the invalid credential. For example, the node representing the invalid credential may be associated with a number of times the node has been observed (e.g., 720). This number may be incremented by one at 810, for example. Other properties associated with valid credential may also be updated, e.g., the timestamp of the most recent receipt of the credential, etc.

At 812, based in the graph-theoretic data structure (e.g., 232), a probability of the login attempt being a malicious login attempt is evaluated. In an exemplary embodiment, this evaluation is be performed by the security module 130. It shall be appreciated that this evaluation may be based on computing a probability that the invalid credential is from either a legitimate user (and, for example, inverting the probability), or from a non-legitimate user. It shall also be appreciated that this evaluation may factor in data such as the likelihood that the originating IP is a location of a legitimate user rather than a malicious user, the likelihood that the destination server(s) is the destination of a legitimate user rather than a malicious user, the protocol and/or port number transmitting the authentication, the likelihood that a malicious user rather than the legitimate user is attempting to access the system at that particular time (e.g., a time that a previously valid login has never been recorded), the likelihood that the legitimate user rather than a malicious user is attempting to access the system from the originating geographical location (e.g., a location distant from the last valid login, a location distant from an account address of the legitimate user, a location from which a valid login has not previously been recorded), etc.

If the probability of the login attempt being a malicious login attempt is below a threshold, a communication is transmitted to the server to reject the login or that the login is invalid. If the probability of the login attempt being a malicious login attempt is above a threshold, at 814, a security incident event is generated and propagated, and an appropriate security policy is applied. The security policy may, for example, communicate (e.g., to the backend authorization server 120) that further login attempts to that account should be prevented, communicate (e.g., to the backend authorization server 120) that further login attempts from the originating IP should be blocked, transmit a message to an IT administrator, etc. In an exemplary embodiment, the security policy applied is dependent on the magnitude of the probability that the login attempt was a malicious login attempt. A communication is also transmitted to the server to reject the login. In one embodiment, a communication is also transmitted to the firewall to reject the login, and in some instances also to propagate the security incident and apply a security policy directly at the firewall.

Accordingly, adjusting authentication conditions in real-time is disclosed. By monitoring login patterns and password heuristics, embodiments of the invention may enhance authentication confidence and actively manage, or assist in the active management of, unauthorized access attempts while minimizing legitimate user inconvenience. Computations of probabilities of a received credentials being from a legitimate or non-legitimate user performed by embodiments may be fed back into a system's overall security infrastructure. In certain applications, this enables an increase in the overall robustness of the security infrastructure (e.g., by enabling special monitoring, blocking, or otherwise rate-limiting traffic from suspicious sources, such as sources of likely malicious login failures).

In some of the embodiments described above, site may refer to a website (e.g., a website for an online account login) for clarity of illustration. However, it should be appreciated that site as generally used herein is not so limited, and may also refer to, for example, an intranet site, a physical site, etc. Additionally, while some embodiments described above discuss real-time adjustments to authentication conditions of a server, it should be appreciated that real-time adjustments of authentication conditions may be made to or triggered in any device/system coupled to the security module, including but not limited to a password protected device (e.g., a mobile phone) and a physical site (e.g., a secured room or building). For example, the security module may be embedded in a mobile phone. In one application, the security module may compute in real-time, based on a graph-theoretic data structure, a probability that a failed pin entered to unlock the phone is unlikely to be originating from the phone's intended user. This may trigger the phone to lock out further attempts, and/or send an email to the user's account address providing the current GPS location of the phone, for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
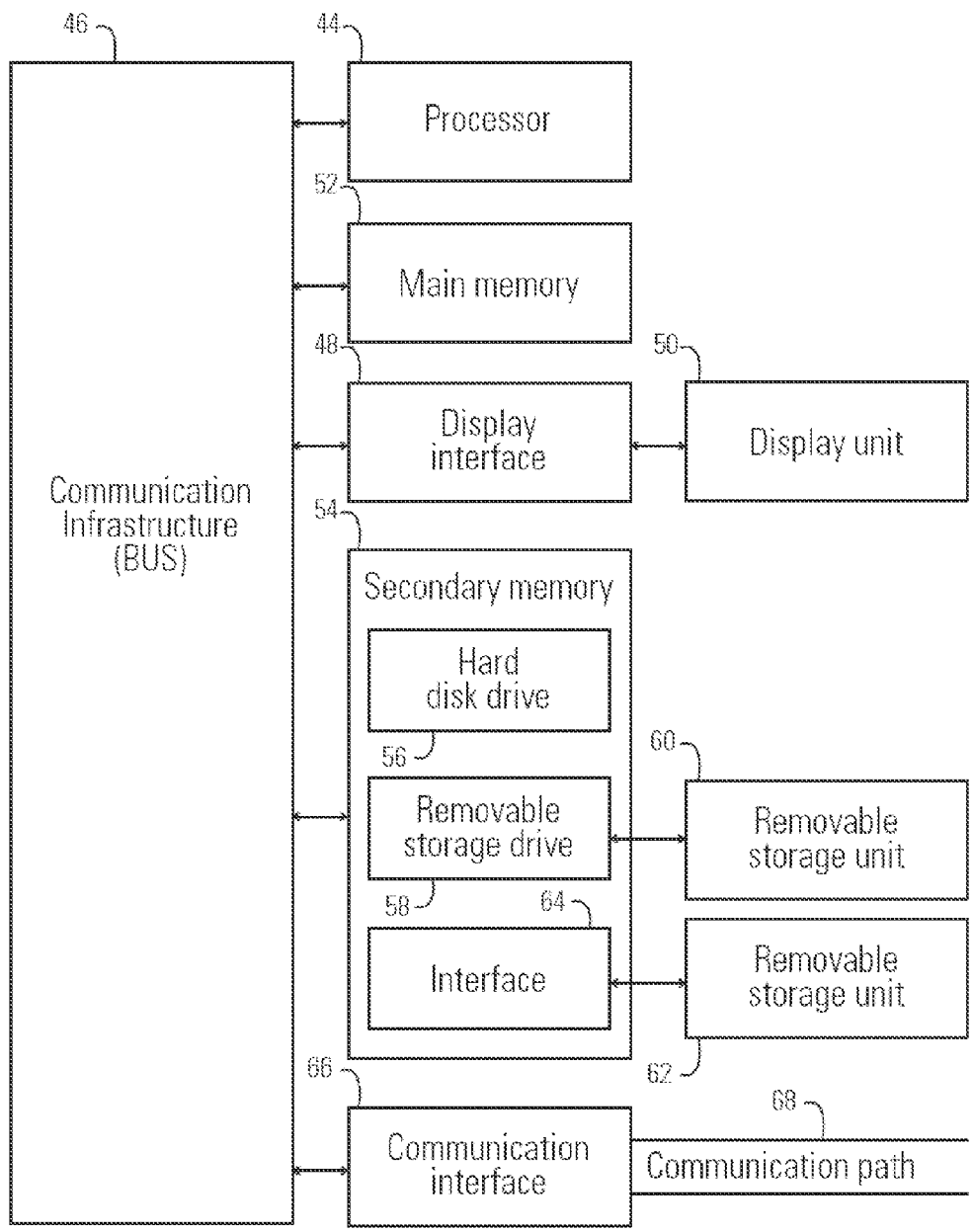
FIG. 9 is a high level block diagram showing an information processing system useful for implementing embodiments of the invention.

FIG. 9 is a high level block diagram showing an information processing system useful for implementing embodiments of the invention. The computer system includes one or more processors, such as processor 44. The processor 44 is connected to a communication infrastructure 46 (e.g., a communications bus, cross-over bar, or network). Various embodiments are described in terms of this exemplary computer system. After reading this description, it will become apparent to a person of ordinary skill in the relevant art(s) how to implement embodiments of the invention using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present invention as discussed herein. In particular, the computer programs, when executed, enable the processor 44 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Further, references to "a method" or "an embodiment" throughout are not intended to mean the same method or same embodiment, unless the context clearly indicates otherwise. Additionally, features of embodiments are not mutually exclusive, unless the context clearly indicates otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for adjusting authentication conditions in real-time, the method comprising:
   dynamically constructing within a device coupled to a physical system a graph-theoretic data structure, the graph-theoretic data structure having nodes corresponding to received valid and invalid authentication credentials used in attempts to access the system, wherein the dynamically constructing comprises:
   if a newly received credential has no corresponding node in the data structure, adding in real-time a new node to the data structure corresponding to the newly received credential and, if a last received preceding credential was an invalid credential, adding a directed edge from a last node corresponding to the last received preceding credentials to the new node, and
   computing in real-time a weight for a directed edge between nodes corresponding to consecutively received credentials;
   in response to receipt of an invalid credential, computing based on the graph-theoretic data structure a probability of the invalid credential being an authentication attempt by a particular type of user; and if the probability is beyond a threshold probability, triggering a security event to adjust an authentication condition of the system.

2. The method of claim 1, wherein each authentication credential is a cryptographic hash value.

3. The method of claim 1, wherein computing in a real-time weight for a directed edge between nodes corresponding to consecutively received credentials comprises:
incrementing a usage count for an edge being traversed between the nodes corresponding to the consecutively received credentials.

4. The method of claim 1, wherein computing based on the graph-theoretic data structure a probability of the invalid credential being an authentication attempt by a particular type of user comprises:
computing based on the graph-theoretic data structure a probability of the invalid credential being an authentication attempt by a legitimate user.

5. The method of claim 4, wherein, if the probability of the invalid credential being an authentication attempt by a legitimate user is above the threshold probability, triggering a security event to adjust an authentication condition of the system comprises:
triggering a security event to exclude the invalid credential as a count against a permissible number of invalid access attempts.

6. The method of claim 4, wherein, if the probability of the invalid credential being an authentication attempt by a legitimate user is below the threshold probability, triggering a security event to adjust an authentication condition of the system comprises:
triggering a security event to lock-out additional attempts to access the system.

7. The method of claim 1, wherein computing based on the graph-theoretic data structure a probability of the invalid credential being an authentication attempt by a particular type of user comprises:
computing based on the graph-theoretic data structure a probability of the invalid credential being an authentication attempt by a malicious user.

8. The method of claim 7, wherein, if the probability of the invalid credential being an authentication attempt by a malicious user is below the threshold probability, triggering a security event to adjust an authentication condition of the system comprises:
triggering a security event to allow additional attempts above a default permissible number of invalid access attempts.

9. The method of claim 4, wherein computing the probability of the invalid credential being an authentication attempt by a legitimate user comprises:
computing, based on the graph-theoretic data structure, a probability of subsequently receiving a valid credential based on receipt of the invalid credential.

10. The method of claim 9, wherein computing, based on the graph-theoretic data structure, a probability of subsequently receiving a valid credential based on receipt of the invalid credential comprises:
identifying all n-hop paths out from a node corresponding to the invalid credential; and
determining what ratio of said all n-hop paths terminate at a valid credential node.

11. The method of claim 10, further comprising:
determining a probability of traversing an n-hop path terminating at the valid credential node; and
scaling the ratio by said probability of traversing.

12. The method of claim 11, wherein determining the probability of traversing is based on a factor selected from the group consisting of: a sum of weights of edges in the n-hop path, a magnitude of n, and a last traversal time of the n-hop path.

13. The method of claim 9, wherein computing, based on the graph-theoretic data structure, a probability of subsequently receiving a valid credential based on receipt of the invalid credential comprises:
computing a historical ratio, wherein the ratio's numerator is a number of times an n-hop path from a node corresponding to the invalid credential to a valid credential node has been historically traversed and the ratio's denominator is a number of times the invalid credential has been historically received.

14. The method of claim 13, further comprising:
scaling the ratio by a factor selected from the group consisting of:
a probability of receiving a valid credential from an originating IP address of the invalid credential,
a probability of receiving a valid credential from an originating geographical location of the invalid credential,
a probability of the system being a security attack target, and
a probability of receiving a valid credential at approximately a time the invalid credential was received.

15. The method of claim 1, wherein dynamically constructing the graph-theoretic data structure further comprises:
pruning the graph-theoretic data structure to remove a node having a property selected from the group consisting of the following:
outgoing edges having a value within a threshold range, and
a shortest n-hop path terminating at a valid credential node, wherein n is at or above a threshold magnitude.

16. A non-transitory computer-readable data storage medium storing computer-readable and code for implementing a security module for triggering real-time adjustments to authentication conditions of a physical system, the security module comprising:
a non-static graph-theoretic data structure comprising:
dynamically constructed nodes corresponding to received valid and invalid authentication credentials used in attempts to access the system, and
dynamically weighted directed edges between nodes corresponding to consecutively received credentials; and
a graph analysis module coupled to the non-static graph-theoretic data structure, wherein the graph analysis module comprising logic components configured to compute, based on the non-static graph-theoretic data structure, a probability of the invalid credential being an authentication attempt by a particular type of user in response to receipt of an invalid credential, and if the probability is beyond a threshold probability, trigger a security event to adjust an authentication condition of the system.

17. The non-transitory-computer readable data storage medium of claim 16, wherein each authentication credential is a cryptographic hash value.

18. The non-transitory-computer readable data storage medium of claim 16, wherein the graph analysis module comprises:

a user probability calculator module, the user probability calculator module being configured to compute, based on the graph-theoretic data structure, a probability of the invalid credential being an authentication attempt by a legitimate user; and a security event transmitter coupled to the user probability calculator module, the security event transmitter configured to transmit a security event to adjust an authentication condition of the physical system if the probability of the invalid credential being an authentication attempt by a legitimate user is above the threshold probability.

19. A system for adjusting authentication conditions in real-time, the system comprising:

a server coupled, via a network, to a client device, the server to require valid authentication credentials from the client device prior to providing the client device access to items in the server;

a backend authorization system coupled to the server, the backend authorization system to establish authentication conditions for access to the server; and a security module coupled to the server and the backend authorization system, the security module comprising:

a non-static graph-theoretic data structure comprising:
dynamically constructed nodes corresponding to received valid and invalid authentication credentials used in attempts to access the server, and
dynamically weighted directed edges between nodes corresponding to consecutively received credentials; and a graph analysis module coupled to the non-static graph-theoretic data structure, wherein the graph analysis module comprising logic components configured to compute, based on the non-static graph-theoretic data structure, a probability of the invalid credential being an authentication attempt by a particular type of user in response to receipt of an invalid credential, and if the probability is beyond a threshold probability, trigger transmission of a security event to the backend authorization system to adjust an authentication condition for access to the server.

20. The system of claim 19, wherein the security module is located in a geographically remote location from the server.

* * * * *